(12) United States Patent
Murayama

(10) Patent No.: US 6,396,499 B1
(45) Date of Patent: May 28, 2002

(54) IMAGE DISPLAYING METHOD, DEVICE, AND COMPUTER-READABLE STORAGE MEDIUM

(76) Inventor: Yoshitaka Murayama, Room No. 202, Amenity Kasuya, 1-10-5, Kasuyu, Setagaya-ku, Tokyo (JP)

( * ) Notice: Subject to any disclaimer, the term of this patent is extended or adjusted under 35 U.S.C. 154(b) by 0 days.

(21) Appl. No.: 09/464,081

(22) Filed: Dec. 16, 1999

(30) Foreign Application Priority Data

Dec. 16, 1998 (JP) ............................................. 10-357125

(51) Int. Cl.$^7$ ................................................. G06K 9/00
(52) U.S. Cl. ....................... 345/443; 345/441; 345/442; 345/426; 345/582; 345/586; 345/588
(58) Field of Search ................................ 345/443, 426, 345/441, 442, 582, 586, 588

(56) References Cited

U.S. PATENT DOCUMENTS

| | | | | |
|---|---|---|---|---|
| 5,432,898 A | * | 7/1995 | Curb et al. ................. | 395/143 |
| 5,831,635 A | * | 11/1998 | Nakamura ................... | 345/443 |
| 6,234,901 B1 | * | 5/2001 | Nagoshi et al. ............... | 463/33 |
| 6,246,417 B1 | * | 6/2001 | Kambe et al. .............. | 345/433 |
| 6,266,444 B1 | * | 7/2001 | Yoshida ...................... | 382/202 |
| 6,297,828 B1 | * | 10/2001 | Fukuzama .................. | 345/443 |

* cited by examiner

*Primary Examiner*—Matthew Luu
*Assistant Examiner*—Daniel J Chung
(74) *Attorney, Agent, or Firm*—Sughrue Mion, PLLC

(57) ABSTRACT

In a method of displaying an emitted light beam seemingly irregularly folded, the emitted light beam is divided into a plurality of segments each of which has an angle which is regularly varied at each segment in accordance with a predetermined simple algorithm with a length and light intensity kept constant. Such segments which are regularly changed in angle can accomplish a powerful image of the emitted light beam when the segments are displayed on a screen of a display device by attaching a polygon and a texture to each segment. Such a display can be realized by simple calculation.

18 Claims, 8 Drawing Sheets

IMAGE DISPLAYING METHOD, DEVICE, AND COMPUTER-READABLE STORAGE MEDIUM

BACKGROUND OF THE INVENTION

This invention relates to an image display method and device for use in a game device or the like and, in particular, to the image display method which is appropriate for displaying an emitted light beam, such as a flash of lightning to obtain a sufficient visual effect. In addition, this invention relates to a computer-readable storage-medium for storing a program for displaying the emitted light beam with high reality.

Conventionally, a wide variety of computer games or video games, such a simulation game, a role playing game, a battle game, a puzzle game, and the like have been proposed and become popular in the world. It is a recent trend that the users' demands or requests for the computer games have been also diversified and varied at every one of the computer games. One of the demands or requests has been directed to displaying a moving image with high reality. Such displaying might serve to give a visual effect to the users or players, as if they would really experience events in a virtual game space.

Among these games, there is a game which displays an emitted light beam, such as a flash of lightning, traveling in a zigzag manner. In this event, it is preferable that the emitted light beam can visually display its power, which might be helpful to augment interest of the users to the game. For example, in a game which is named "fantastic Suikoden" (fantastic Chinese famous story), the flash of lightning is displayed as an example of the emitted light beam and travels from an upper part to a lower part of a screen.

Conventionally, such an emitted light beam, such as the flash of lightning, has been expressed like an animation on a screen by successively displaying a plurality of bit map images in sequence. However, it is difficult to visually display a flash of lightning with reality and to visually express a wide variety of lightning. Under the circumstances, it is a recent trend that consideration is focused on simulating an actual flash of lightning.

However, it is to be noted that an actual flash of lightning is irregularly folded and separated. As a result, it is very laborious to observe irregular actual flashes of lightning and to simulate such irregular actual flashes of lightning. Practically, simulating the irregular actual flashes of lightning is not economical and can not be therefore applied to a game device because a memory capacity and a cost are restricted in such a game device.

Moreover, a faithful reproduction of the actual flash of lightning can not always display a powerful image in a virtual space within a game device. This shows that some exaggeration is needed in the virtual space to visually satisfy the users when the emitted light beam, such as the flash of lightning, is displayed by the game device.

SUMMARY OF THE INVENTION

It is an object of this invention to provide a method which is capable of displaying an emitted light beam as a powerful image in a virtual space on a screen of a display device.

It is another object of this invention to provide a method of the type described, which can display the emitted light beam with a sufficient visual effect.

It is still another object of this invention to provide a computer-readable storage medium which stores a program which can effectively display the emitted light beam, such as a flash of lightning.

It is yet another object of this invention to provide an image display device which can display the emitted light beam somewhat visually exaggerated.

According to an aspect of this invention, a method is for use in visually and virtually displaying, on a display device, an emitted light beam which travels from a start point in a zigzag manner. The method comprises the steps of determining a first reference line drawn at the start point of the emitted light beam and a final target point defining a final attainable zone, connecting the start point and the final target point by a reference zone line which is inclined at a predetermined angle with respect to the first reference line, defining a first segment which is extended from the start point at a first angle smaller than the predetermined angle towards the final target point and which represents a part of the emitted light beam from the start point, calculating a length of the first segment between the start point and a first point which follows the start point and at which the emitted light beam is folded, together with light intensity related to the first segment, determining a second segment between the first point and a second point which succeeds the first point and at which the emitted light beam is folded, so as to represent another part of the emitted light beam by the second segment, successively calculating a length, an angle, and light intensity of another part of the emitted light beam represented by the second segment on the basis of the length, the angle, and the light intensity of the first segment, and displaying the emitted light beam which falls within the final attainable zone by repeating the successive calculation of the length, the angle, and the light intensity of the emitted light beam.

According to another aspect of this invention, a computer-readable storage medium stores a program for visually and virtually displaying, on a display device, an emitted light beam which travels from a start point in a zigzag manner. The program comprises the steps of determining a first reference line drawn at the start point of the emitted light beam and a final target point defining a final attainable zone, connecting the start point and the final target point by a reference zone line which is inclined at a predetermined angle with respect to the first reference line, defining a first segment which is extended from the start point at a first angle smaller than the predetermined angle towards the final target point and which represents a part of the emitted light beam from the start point, calculating a length of the first segment between the start point and a first point which follows the start point and at which the emitted light beam is folded, together with light intensity related to the first segment, determining a second segment between the first point and a second point which succeeds the first point and at which the emitted light beam is folded, so as to represent another part of the emitted light beam by the second segment, successively calculating a length, an angle, and light intensity of another part of the emitted light beam represented by the second segment on the basis of the length, the angle, and the light intensity of the first segment, and displaying the emitted light beam which falls within the final attainable zone by repeating the successive calculation of the length, the angle, and the light intensity of the emitted light beam.

According to a further aspect of this invention, an image display device is used for in visually and virtually displaying, on a display device, an emitted light beam which travels from a start point in a zigzag manner. The image display device comprises first processing means for processing the emitted light beam, by dividing the emitted light beam into a sequence of segments each of which is folded at an end point, by determining a first reference line drawn at the start point of the emitted light beam and a final target point defining a final attainable zone, by connecting the start point and the final target point by a reference zone line which is inclined at a predetermined angle with respect to the first reference line, by defining a first segment which is extended from the start point at a first angle smaller than the predetermined angle towards the final target point and which represents a part of the emitted light beam from the start point, and by thereafter successively determining an angle, a length, and light intensity of the following segments on the basis of the angle, the length, and the light intensity calculated in connection with the segment immediately before, and by allowing a final one of the segment to pass through the final attainable zone and second processing means for putting images representative of the emitted light beam along the segments.

In this event, the first processing means varies the following angle of the next one of the segments by using a previous one of the segments as a reference line and calculates the angle, the length, and the light intensity of each segment on the condition that each length and light intensity is invariable. On the other hand, the second processing means comprises means for forming an image of the emitted light beam by putting a polygon and a texture representative of the emitted light beam, along the segments and means for adjusting a color of the image.

DESCRIPTION OF THE PREFERRED EMBODIMENTS

Figure 1:
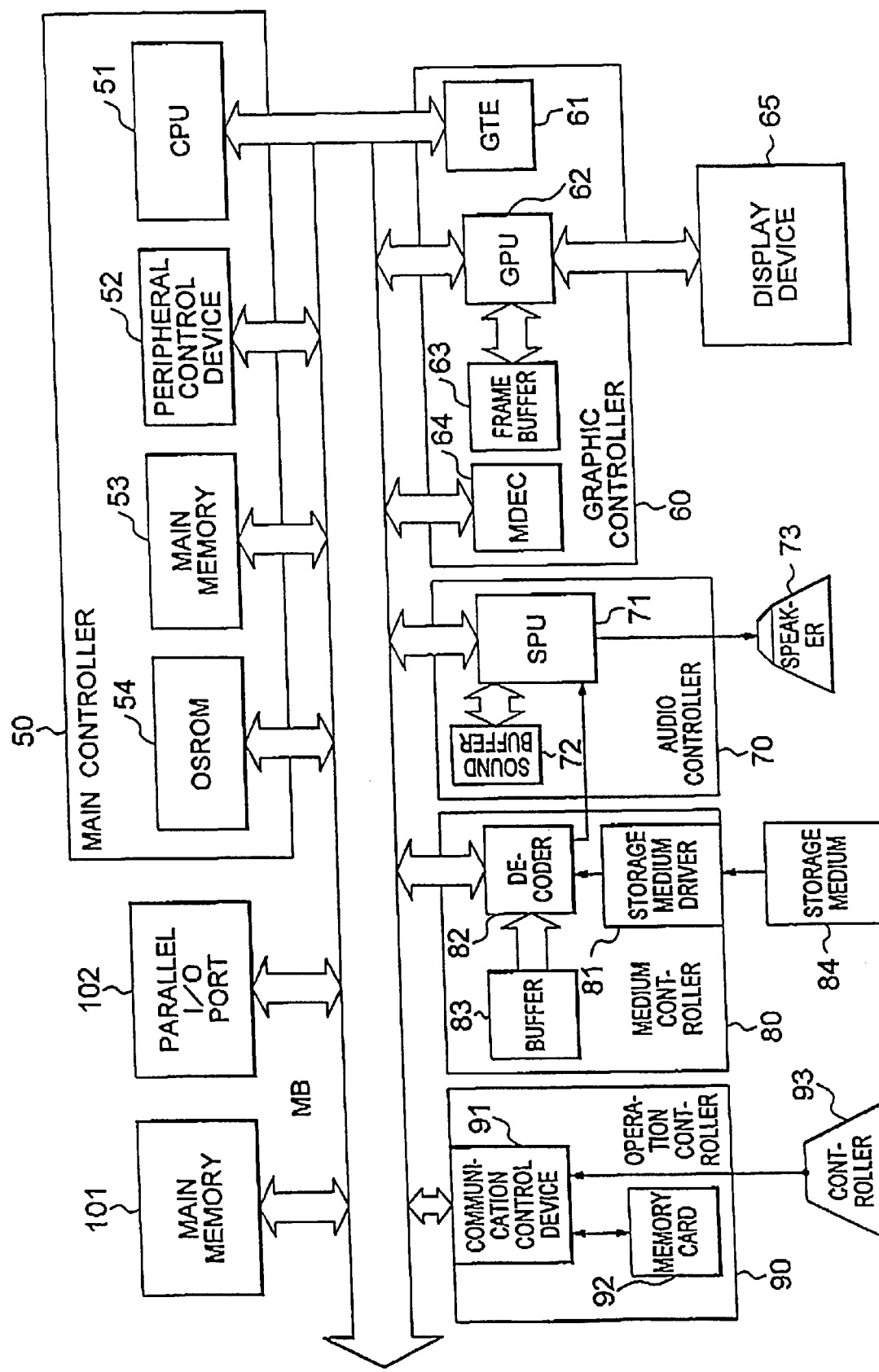
FIG. 1 is a block diagram of a game device to which this invention is applicable.

Referring to FIG. 1, description will be made about an example of a game apparatus to which this invention is applicable. Although a family use game device is exemplified as the game apparatus in FIG. 1, this invention can be applicable to a personal computer device, a graphic computer device, a business use game device, and so on.

Herein, it is to be noted that a program which executes a game according to this invention is stored in a computer readable storage medium (will be simply called a storage medium hereinafter) which may be, for example, an optical disk, such as a CDROM and is read out of the storage medium in response to instructions issued by an operator or a player when the storage medium is loaded in the game apparatus.

As shown in FIG. 1, the illustrated game apparatus has a main controller 50, a graphic controller 60, an audio controller 70, a medium controller 80, and an operation controller 90, all of which may be collectively referred to as a control unit. The illustrated control unit, namely, the controllers 50 to 90 are all connected to a main bus MB together with a serial I/0 port 101 and a parallel I/O port 102. The illustrated serial I/O port 101 is used to communicate with other game devices and the like while the parallel I/O port 102 is used to be connected to any other peripheral devices. In addition, the main controller 50, the operation controller 90, and the medium controller 80 is operable to execute the game in response to a maneuver of the player and may be called a game controller also.

The illustrated main controller 50 has a central processing unit (CPU) 51, a peripheral device controller 52, a main memory 53, and an operating system (OS) ROM 54. More specifically, the peripheral device controller 52 in the main controller 50 executes interruption control, time control, memory control, direct memory access (DMA) transfer control, and so on. On the other hand, the main memory 53 is implemented, for example, by a RAM which has a memory capacity of two megabytes while the OSROM 54 is structured, for example, by an ROM which has a memory capacity of 512 kilobytes. The OSROM 54 is assumed to store an OS which is operable to control the main memory 53, the graphic controller 60, the audio controller 70.

In FIG. 1, the central processing unit (CPU) 51 may be a RISC (Reduced Instruction Set Computer) CPU and controls the remaining elements in accordance with the OS stored in the ROM 54. The illustrated CPU 51 has an instruction cache, a scratch pad memory and also administrates a real memory.

The graphic controller 60 is structured by a geometry transfer engine (GTE) 61, a graphic processing unit (GPU) 62, a frame buffer 63, and an expander (which may be called a motion decoder (MDEC) as will become clear later) 64. The GPU 62 of the graphic controller 60 is connected to a display device 65 which serves as a display controller which controls displayed images of the game.

The display device 65 may be, for example, a television monitor, in the usual family use computer game device or a computer display unit in the personal computer or a work station. In addition, the display device 64 may be a game display apparatus in the business use game device.

In the graphic controller 60, the geometry transfer engine (GTE) 61 is implemented by a co-processor for processing a coordinate conversion or the like while the graphic processing unit (GPU) 62 paints a picture in response to a paint instruction. Such a picture is displayed on the display device 65 in the form of a picture image. The picture image painted by the GPU 62 is stored in the frame buffer 63. In addition, the expander 64 carries out orthogonal transform, such as discrete cosine transform, and decodes a compressed and encoded image data signal into a motion picture. In this connection, the expander 64 may be referred to as the MDEC, as mentioned before.

Furthermore, the geometry transfer engine (GTE) 61 has a parallel calculation circuit for executing a plurality of calculations in parallel. Specifically, the GTE 61 cooperates with the CPU 61 and may be called a co-processor for carrying out coordinate conversion in response to a calculation request sent from the CPU 51. In addition, the GTE 61 can also execute, at a high speed, an inner product between a tangential vector and an optical source vector together with a fixed point calculation related to a matrix and a vector.

The illustrated GTE 61 can carry out calculations of polygons of 150 millions per second to transform the coordinate when a triangle polygon is subjected to flat shading such that the single triangle polygon is painted in the same color. From this fact, it is readily understood that the illustrated GTE 61 is helpful to alleviate a burden imposed on the CPU 51 and can carry out high speed coordinate conversion. Herein, the term "polygon" means a minimum unit of a figure that is displayed as a three-dimensional object and takes a shape of a polygon, such as a triangle, a rectangle, or the like.

The graphic processing unit (GPU) 62 is operable in response to the paint instructions sent from the CPU 51 to paint each polygon. Practically, the illustrated GPU 62 can paint the polygons of 360,000 pieces per second and has two-dimensional address space for mapping a space of the frame buffer 63.

The frame buffer 63 is structured by a dual port RAM and can simultaneously execute write-in operation from the GPU 62 and the main memory 53 and readout operation on displaying. Practically, the frame buffer 63 has a memory capacity of, for example, 1 megabyte and may be specified by a matrix of picture elements of sixteen bits. The picture elements are arranged in rows of 1024 and in columns of 512. In the illustrated example, it is assumed that the frame buffer 63 has a display zone partitioned into a plurality of partial display zones and a non-display zone except the display zone. Each of the partial zones can be individually sent to the display device 65. On the other hand, the non-display zone has a color lookup table (CLUT) area and a texture area. The CLUT area serves to store a CLUT referenced by the GPU 62 on painting each polygon while the texture area serves to store textures or materials mapped into each polygon painted by the GPU 62. Moreover, the illustrated frame buffer 63 can carry out the DMA transfer to the main memory 53.

The MDEC 64 in the graphic controller 60 is operable under control of the CPU 51 to read an image data signal of a static image or a moving image out of the main memory 53 and to decode the image data signal to be stored into the main memory 53 again. Specifically, the MDEC 64 can execute inverse discrete cosine transform (IDCT) at a high speed and also can expand the image data signal which is compressed in accordance with the JPEG and the MPEG techniques and which is read out of the storage medium 84. The resultant image data signal is reproduced and is sent through the GPU 62 to the frame buffer 63. Such a reproduced image can be used as a background image of an image painted by the GPU 62.

The audio controller 70 has a sound processing unit (SPU) 71 for generating a musical sound, an imitation effective sound, or the like on the basis of the instructions sent from the CPU 51, a sound buffer 721 of, for example, 512 kilobytes for storing sound source data, sound data read out of the storage medium 84, and a speaker 73 which generates audible sounds and tones, such as the musical sound, sent from the SPU 71 and which serves as a sound output device.

In the illustrated example, the SPU 71 has a ADPCM function which can reproduce an audio data signal which is subjected to adaptive differential encoding (ADPCM) and which is specified by a differential code of four bits obtained by differentially encoding audio data signals of sixteen bits. In addition, the illustrated SPU 71 is also operable to reproduce the imitation effective sound from the sound source data signals stored in the sound buffer 72 and to reproduce a modulated sound data signal obtained by modulating the sound data signals stored in the sound buffer 72.

More specifically, the illustrated SPU 71 which is operable under control of the CPU 51 has twenty-four ADPCM sound sources automatically variable in accordance with operation parameters determined by coefficients, such as looping, time, and the like. In addition, the SPU 71 has an individual address space obtained by mapping the space of the sound buffer 72 and transfers the ADPCM data signals from the CPU 51 to the sound buffer 72 and reproduces them in accordance with key on/off information and/or modulation information.

The audio controller 70 which may be also called a sound system has the above-mentioned functions and is collectively used as a sampling sound source for generating the musical sound, the imitation effective sound, on the basis of the audio data signals stored in the sound buffer 72.

Next, the medium controller 80 has a storage medium driver 81, a decoder 82, and a buffer 83. Practically, the storage medium driver 81 is loaded with the storage medium 84, such as the CDROM, a hard disk, an optical disk, a flexible disc, a semiconductor memory, or the like. In the illustrated example, the CDROM is assumed to be used as the storage medium in the illustrated example. In this connection, the storage medium driver 81 may be formed by a CDROM driver and the decoder 82 may be formed by a CDROM driver.

The storage medium driver 81 is operable to reproduce the program, the data signals, and the like stored in the storage medium 84, namely, the CDROM while the decoder 82 is operable to decode the program, the data signals, and the like which include, for example, error correcting codes. The buffer 83 is implemented by an RAM with a memory capacity of, for example, 32 kilobytes and serves to temporarily store reproduced data signals from the storage medium driver 81.

The illustrated example can support a data format of CD-DA, CDROM-XA. The decoder 82 is operable as a part of the audio controller 70 because the audio data signals stored in the storage medium 84 are also reproduced.

The audio data signals stored in the storage medium 84 and reproduced by the storage medium driver 81 may be, for example, the ADPCM data signals (ADPCM data signals in CDROM XA) as mentioned above or PCM data signals obtained by analog-to-digital conversion of the audio signals.

The ADPCM data signals may be represented by differential signals of four bits obtained from the audio digital signals of sixteen bits and are read out of the storage medium 84 to be subjected to error correction and decoding by the decoder 82 and thereafter to be sent to the SPU 71. The SPU 71 carries out the digital-to-analog conversion of the readout audio signals to be supplied to the speaker 74.

On the other hand, when the audio data signals are recorded in the storage medium 84 in the form of the PCM data signals of sixteen bits, the PCM data signals are decoded by the decoder 82 into decoded audio signals to be sent to the speaker 73. At any rate, audio output signals of the decoder 82 is once delivered into the SPU 71 to be mixed with the output signals of the SPU 71 and to be finally sent to the speaker 73.

Further referring to FIG. 1, the operation controller 90 has the communication control device 91 and an additional memory 92, such as a memory card, coupled to the communication control device 91. The communication control device 91 controls communication between a controller 93 and the CPU 51 through the main bus MB. The controller 93 is manipulated by a player to input an instruction from the player. The additional memory 92 is used to memorize the input instructions from the controller 93 and a state of the game.

The illustrated controller 93 serves as an interface which transmits the player's intention to an application or game program. To this end, the controller 93 has, for example, sixteen operation keys of which the states are transmitted about sixty times per second to the communication control device 91 by the use of synchronization communication. The communication control device 91 transmits the states of the operation keys to the CPU 51 through the main bus MB. Practically, the illustrated game device has two connectors each of which is connected to the controller 93 and may have a multi-tap terminal which is connected to a multiple number of the controllers 93.

At any rate, the instructions from each player are given to the CPU 51 in response to the manipulation of the player while the CPU 51 carries out processing in accordance with the instructions under control of the game program executed in the game device.

When the game which is being executed is to set or a score of the game is memorized at the end of the game or on the way, data signals in question are transmitted from the CPU 51 to the communication control device 91 and thereafter stored into the additional memory or memory card 92 through the communication control device 91. The memory card 92 is not directly connected to the main bus MB and can be detached from the game device with the power source kept on. Under the circumstances, it is readily understood that the data signals related to the game can be memorized into a plurality of the memory cards 92.

In the illustrated game device, a great amount of image data signals must be transferred at a high speed among the main memory 53, the GPU 62, the MDEC 64, and the decoder 82, when the program is read out of the storage medium 84 and images are displayed or pictures are painted.

For this purpose, the DMA transfer can be carried out in the illustrated game device to dr y transfer data signals among the main memory 53, the GPU 62, the MDEC 64, the decoder 82 under control of the peripheral device controller 52. Inasmuch as such DMA transfer is carried out without using the CPU 51, it is possible to alleviate a burden of the CPU 51 and to also accomplish high speed data transfer.

The following description will be made about a method according to this invention which is executed by the use of the game device illustrated in FIG. 1.

Figure 2:
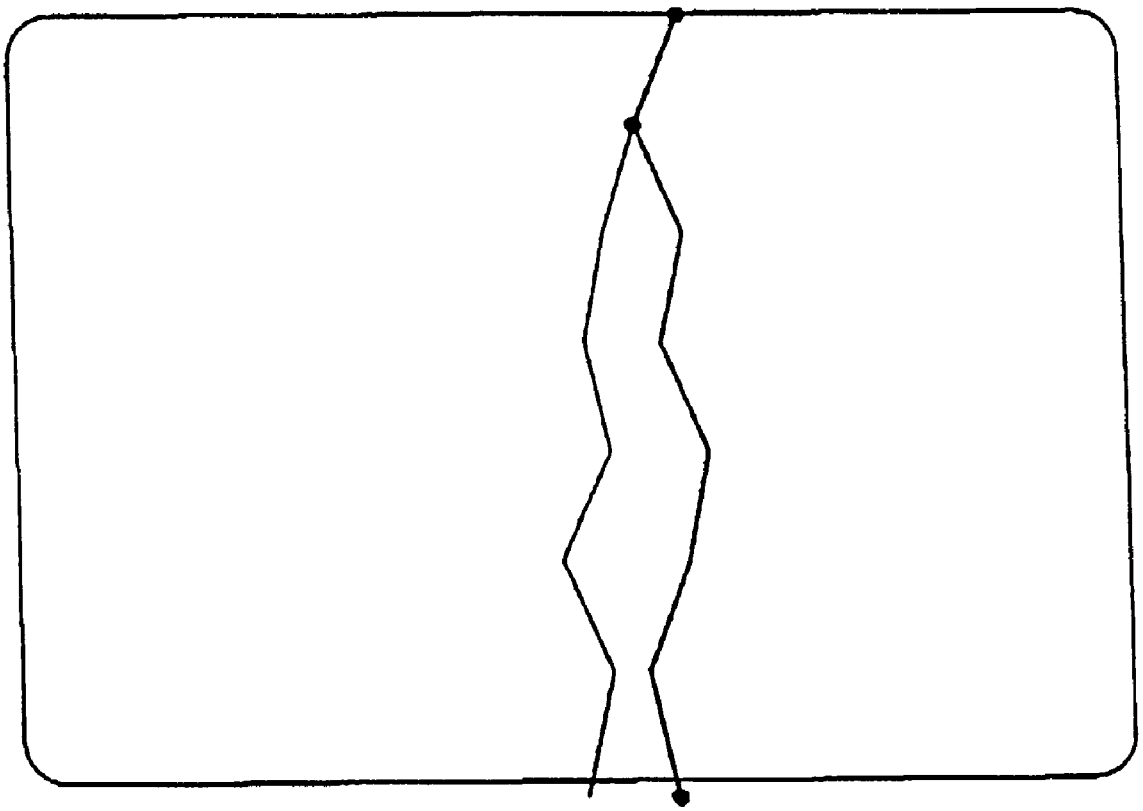
FIG. 2 shows a diagrammatic view for use in exemplifying a display according to this invention.

Referring to FIG. 2, an emitted light beam, such as a flash of lightning, is drawn by the use of an image display method according to this invention and is displayed on a screen of the display device 65. The illustrated flash of lightning appears from an upper portion of the screen and is bifurcated or separated on the way into a main light beam and a branch light beam or a sub-light beam. Thereafter, each of the main light beam and the sub-light beam travel downwards of FIG. 2 in a zigzag manner and finally reach at bottom ends. As will become clear as the description proceeds, the illustrated main light and sub-light beams are regularly folded in accordance with a predetermined simple algorithm or rule and can be visually displayed on the screen of the display device 65 used in the game device, with a visual effect which is more excellent than an actual flash of lightning. Namely, a powerful image of the flash of lightning can be achieved by the use of the method according to this invention.

Figure 3A:
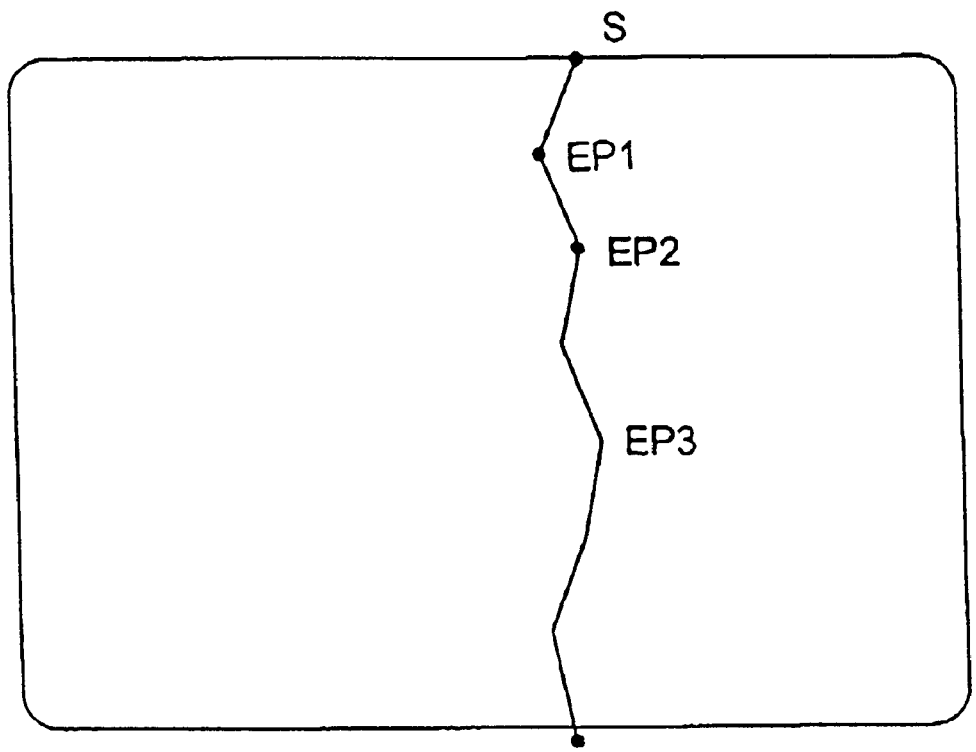
FIGS. 3A and 3B show views for use in describing a principle of this invention.
Figure 3B:
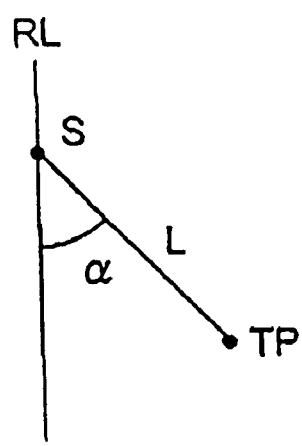

Referring to FIGS. 3A and 3B together with FIG. 4, description will be made about a principle of the image display method according to this invention. Herein, the main light beam alone will be at first described and thereafter the sub-light beam will be mentioned. As shown in FIG. 3A, a start point S of the flash of lightning is determined in an area which is located outside of the screen and which is invisible. The illustrated flash of lightning is divided into a sequence of segments each of which has an end point and which is folded at each point. A first one of the segments is extended from the start point S to its end point EP1, as illustrated in FIG. 3A. Although a single start point alone is illustrated in FIG. 3A, a plurality of start points may be set in the area located outside of the visible area on the screen.

Figure 4:
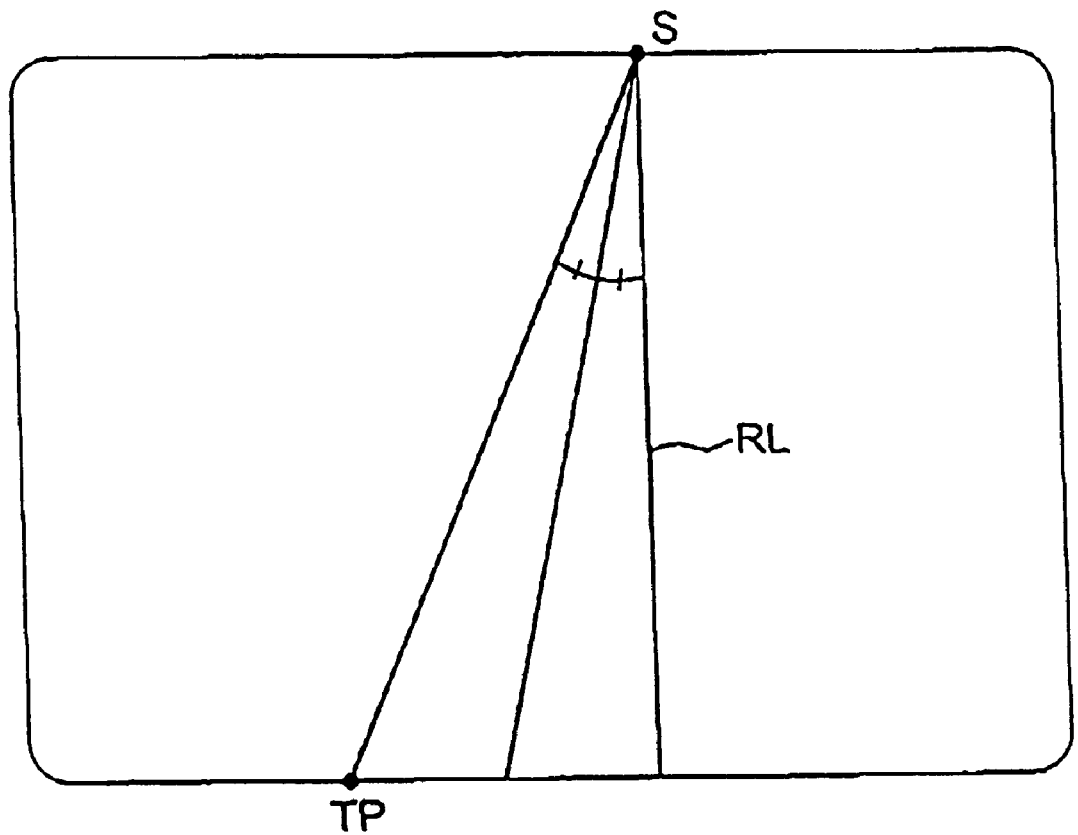
FIG. 4 shows a view for use in describing an initial step of an image display method according to an embodiment this invention.

At first, a first reference line RL is drawn at the start point S, as illustrated in FIG. 3B, and is vertically extended in the example, as shown in FIG. 4. In addition, a final target point TP as shown in FIG. 4 is also decided at a bottom of the screen to define a final attainable zone within which the lightning is finally passed. In other words, the lightning falls within the final attainable zone and does not fall outside of the final attainable zone. Furthermore, processing is made by the CPU 51 at the start point S to calculate an angle, a length, and light intensity of the first segment.

As illustrated in FIG. 4, the start point S is connected to the final target point TP by a line which may be called a reference zone line which is inclined at a predetermined angle with respect to the first reference line RL. The illustrated angle of the first segment falls within an angle range which is smaller than the predetermined angle and which is preferably less than a half the predetermined angle in the illustrated example. The angle of the first segment may be referred to as an emission angle of the main light beam depicted by α in FIG. 3B and is determined at random within the angle range.

As illustrated in FIG. 3B, the first segment has the emission angle α and a predetermined length L. Moreover, it is noted that the light intensity of the lightning displayed by the first segment is also predetermined in the illustrated example.

A second one of the segments is connected to the end point EP1 of the first segment, as shown in FIG. 3A, and has an emission angle determined by using the first segment as a reference line and a length equal to that of the first segment. It is assumed in this example that the light intensity of the lightning represented by the second segment is also equal to the light intensity of the lightning represented by the first segment. The emission angle of the second segment falls with a prescribed range with respect to the first segment as the reference line and is decided at random within the prescribed range. The above-mentioned angle ranges determined for the first and the second segments are effective to prevent the lightning from being directed upwards of the screen and, in particular, serve to direct each of the first and the second segments downwards relative to a horizontal direction. Stated otherwise, a restriction is imposed on lightning running from a downward side to an upward side.

As mentioned before, the first segment has the emission angle, namely, a first angle α with respect to the first reference line RL drawn at the start point S and is extended to its end point, namely, a first end point EP1. The first segment has the length, namely, a first length L and light intensity (namely, first light intensity) and is used to represent the main light beam of the flash of lightning.

The second segment extended between the first end point EP1 and the second end point EP2 is defined by the angle, the length, and the light intensity which may be referred to as a second angle, a second length, and second light intensity, respectively, and which are determined on the basis of the first angle, the first length, and the first light intensity, respectively. In the illustrated example, it is assumed that the second length and the second light intensity are equal to the first length and the first light intensity, respectively, while the second angle is determined at random within the prescribed angle range. This is true of the other segments.

It has been found out that the emitted light beam can be simply displayed on a screen by making the lengths and the light intensity of each segment invariable and by varying each angle of the segments at its end point at random. It has been also found out that such displaying the lightning is very effective to obtain a powerful image of the lightning.

Referring back to FIG. 2, description will be made about the sub-light beam branching from the main light beam. The illustrated sub-light beam has light intensity weaker than that of the main light beam and a sub-light beam length shorter than each length of the segments for the main light beam. In the example illustrated, the light intensity and the sub-light beam length of the sub-light beam are equal to two-third of the light intensity and the length of the main light beam, respectively. Each sub-light beam, namely, each segment for the sub-light beam is extended from an end point of the segment at an angle which is determined at random within a predefined angle range with respect to a previous segment prior to branching. At any rate, the angle of each sub-light beam is calculated by using a previous segment as a reference line.

Thus, processing related to the main light beam and the sub-light beam is finished when a final end point of the main light beam exceeds the display area of the screen.

Figure 5:
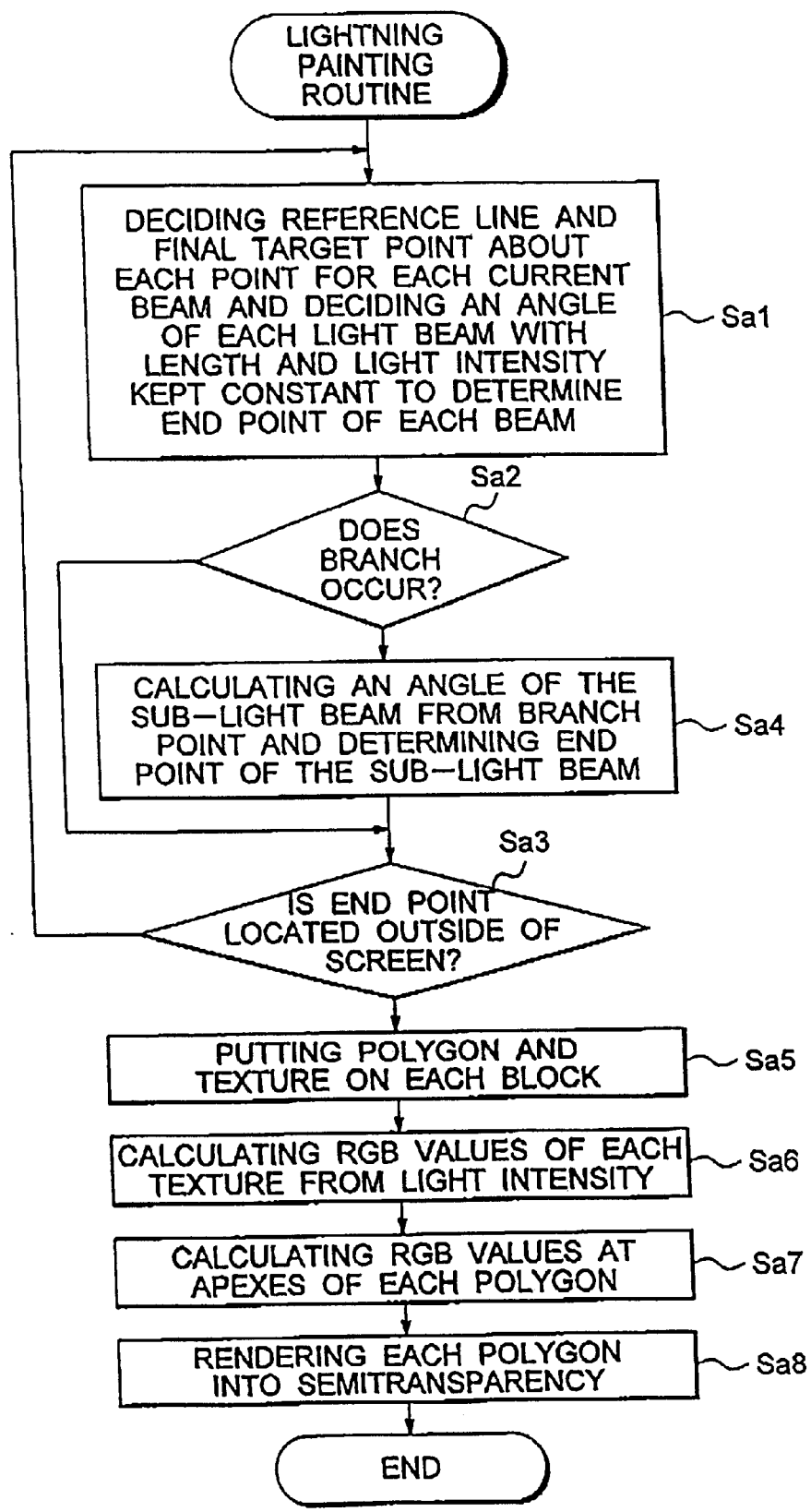
FIG. 5 shows a flow chart for use in describing operation according to the image display method according to this invention.

Referring to FIG. 5 together with FIG. 1, the image display method according to the embodiment of this invention will be described in detail. In the game device illustrated in FIG. 1, it is assumed that the game program which executes the image display method is previously loaded into the main memory 53 and is being played by the user. During playing the game, an indication of displaying the flash of lightning is issued in accordance with a predetermined procedure determined by the game program. In this event, the processing is moved to a lightning painting routine illustrated in FIG. 5.

In the lightning painting routine, decision is made at a step Sa1 about a reference line of each point S prepared for each flash of lightning, namely, a light beam which is currently present. In addition, decision is also made at the step Sa1 about an angle of each light beam at each point with the length and the light intensity kept constant. As a result, the end point EP of each light beam is determined at the step Sa1. This shows that the processing is carried out in connection with a single block having a block length determined by the length of each light beam and proceeds to a next block.

When the start point S of each light beam is processed as each point at the step Sa1, the first reference line RL which is vertically extended from the start point S, as illustrated in FIG. 4, is decided as the reference line at the step Sa1 together with the final target point TP. On the other hand, when each end point of the light beam is processed at the step Sa1, processing is carried out by using a previous segment for the main light beam as the reference line.

At each end point, judgement is made at a step Sa2 about whether or not any branch of the sub-light beam is caused to occur from the main light beam. In the illustrated example, the branch of the sub-light beam appears at each end point with a predetermined probability. Another sub-light beam may further branch from the sub-light beam. On no detection of any branch, the step Sa2 is followed by a step Sa3 at which judgement is made about whether or not each end point of the light beam is located outside of the display area of the screen. When each end point is located inside of the screen, the step Sa3 is returned back to the step Sa1 at which the point is judged as a leading or start point of each light beam and calculation is carried out to obtain the angle of the light beam with the length and the light intensity kept constant.

On the other hand, when detection is made about occurrence of the branch of the sub-light beam, the step Sa2 proceeds to a step Sa4 at which calculation is carried out about the sub-light beam to obtain an angle of the sub-light beam separated from a branch point. In this event, the length and the light intensity of the sub-light beam are determined so that they become equal to two-third of each of the length and the light intensity of the main light beam. Consequently, processing is advanced by one block determined by the length of the sub-light beam and is moved to a next end point of the sub-light beam. In this event, the next end point of the sub-light beam becomes a next start point on executing the processing at the step Sa1. Thereafter, the sub-light beam is processed at the step Sa1 so that the length and the light intensity of the sub-light beam become short and weak as compared with those of the main light beam.

The above-mentioned steps Sa1 to Sa4 are executed under control of the CPU 51 by processing data read out of the main memory 53 and may be collectively called a first processing step of processing the main light beam and the sub-light beam in accordance with the predetermined algorithm or rule. In this connection, a combination of the CPU 51 and the main memory 53 is operable as a processing portion for executing the first processing step.

When either one of the end points of the main light or the sub-light beams is located outside of the screen, the step Sa3 proceeds to a step Sa5 for putting a polygon and a texture on each block in a manner to be described later. Calculation of coordinates of each polygon is executed within the GTE 61 of the graphic controller 60 illustrated in FIG. 1 and each polygon is put along and attached onto each segment representative of the main light and the sub-light beams one by one. Specifically, attachment of each polygon to each segment is carried out so that each segment is positioned at a center portion of each polygon and, in other words, each segment is orthogonal to two opposite sides of each polygon. At the illustrated step Sa5, the texture which is representative of the main light and the sub-light beams is attached to each polygon after attachment of the polygon to each segment. On attachment of the texture, a lightning texture is read out of a texture area of the frame buffer 63 and is put on each polygon.

In the illustrated example, the lightning textures for the main light beam and the sub-light beam are prepared in the frame buffer 63 and are repeatedly attached to each polygon. Such attachment of the textures to the polygons is carried out under control of the GPU 62. After completion of the step Sa5, processing proceeds to a step Sa6 at which RGB values of each texture attached to each polygon are calculated from the light intensity given to each segment.

Figure 6:
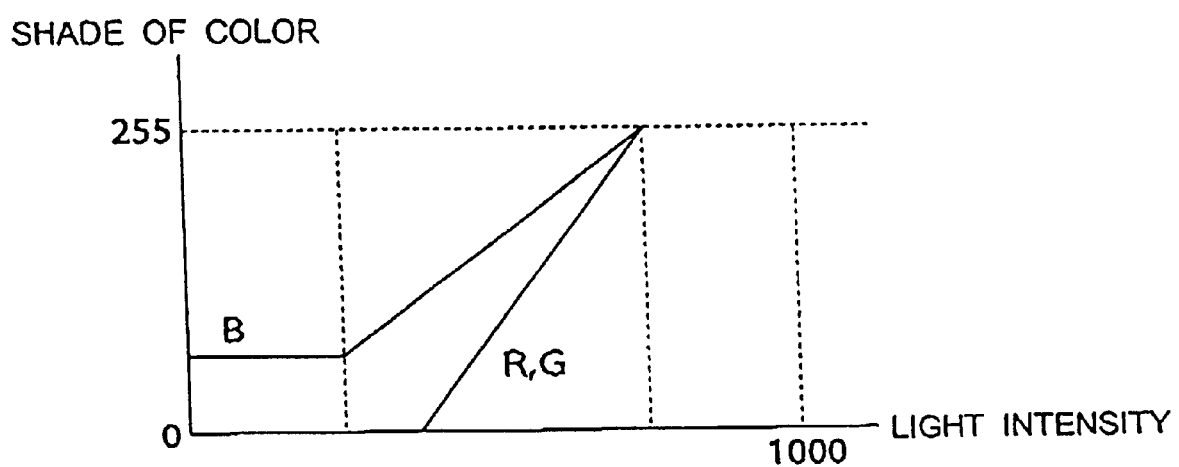
FIG. 6 shows a graphical representation for use in describing a relationship between light intensity and a shade of color.

Referring to FIG. 6, illustration is made about shades of red (R), green (G), and blue (B) components. In the example illustrated in FIG. 6, each of red, green, and blue components is represented by eight bits. As readily understood from FIG. 6, the blue (B) component alone appears and is displayed when the light intensity is weak while the red (R)

and the green (G) components are gradually added to the blue (B) component and increased as the light intensity becomes high. Accordingly, the lightning becomes whitish with an increase of the light intensity. However, it has been found out that the lightning can be displayed with reality by lowering the red and the green components as compared with the blue component.

When the RGB values are determined about each texture in the above-mentioned manner, the step Sa6 is moved to a step Sa7 at which RGB values are determined about apexes of each polygon.

Figure 7:
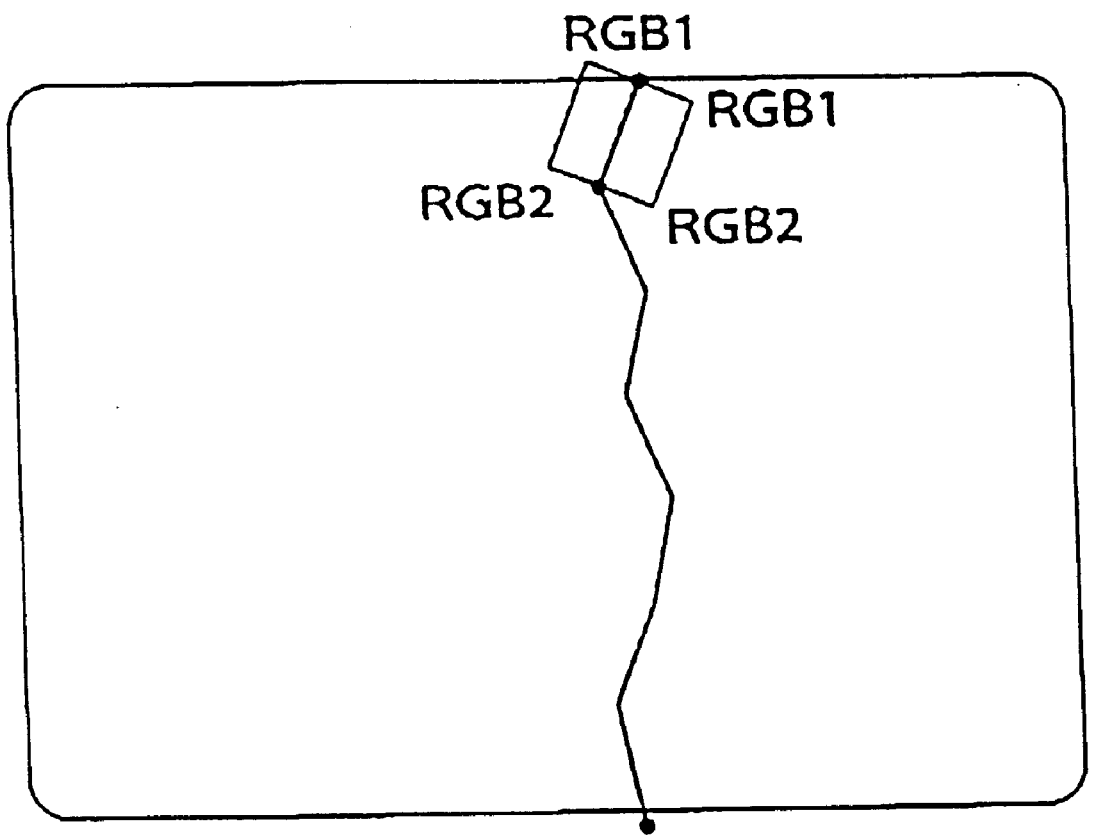
FIG. 7 shows a flow chart for use in describing one step illustrated in FIG. 5.

Temporarily referring to FIG. 7, decision of the RGB values is made only about the upper side and the lower side of each polygon of a rectangular shape in the illustrated example. The RGB values on the upper and the lower sides are represented by RGB1 and RGB2, respectively, in FIG. 7. With this structure, an image display can be made such that the color of each polygon is varied or changed along a traveling direction of the lightning.

The above-mentioned color processing can be executed by storing color information in the CLUT area of the frame buffer 63 and by reading the color information out of the CLUT area under control of the GPU 62.

Referring back to FIG. 5, each polygon is painted or rendered into semitransparent color at a step Sa8. Such semitransparent processing can be readily executed by the use of a function prepared in the game device illustrated in FIG. 1.

After the semitransparent processing is finished, the lightning painting routine illustrated in FIG. 5 is completed. From this fact, it is understood that such lightning painting routine can display the flash or flashes of lightning illustrated in FIG. 2.

In the above description, the processing for attaching the polygon and the texture may be called a second processing step which may be carried out under control of the GPU 62. In other words, the GPU 62 is operable as a second processing portion for executing the second processing step.

Figure 8:
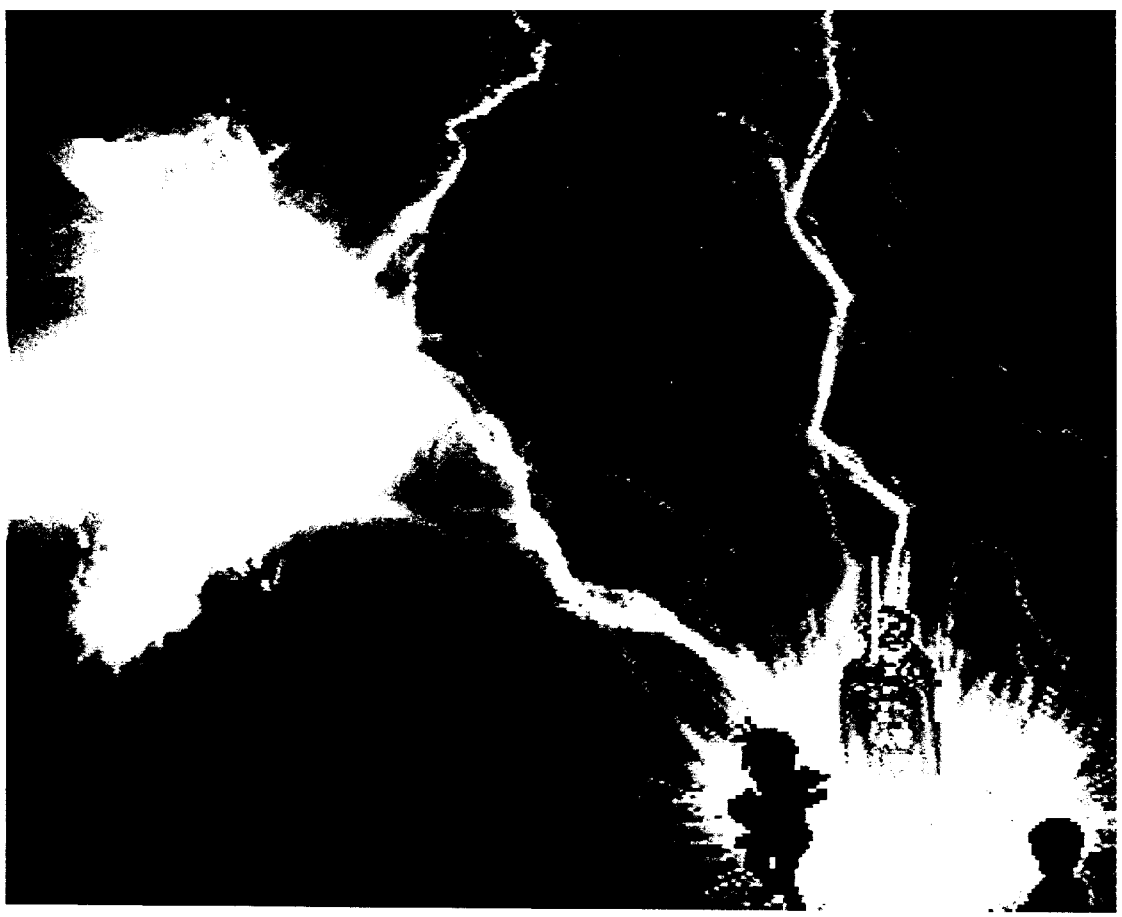
FIG. 8 shows an example of a lightning image displayed on a screen by using the method according to this invention.

Referring to FIG. 8, an example of an actual image is illustrated which is displayed by the use of the lightning painting routine according to this invention. As shown in FIG. 8, the flashes of lightning which have complicated loci are drawn by a plurality of light beams and such light beams establish a powerful visual image. This means that very effective visual effects can be achieved by using a simple algorithm and call users' attention to the game.

While this invention has thus far been described in conjunction with a preferred embodiment thereof, it will readily be possible for those skilled in the art to put this invention into practice in various other manners. For example, the length and the light intensity of each segment may be changed under a predetermined simple rule, although the above-mentioned description has been kept constant in the length and the light intensity of each segment. The emitted light beam may not be restricted to the lightning but may be used to display an optical beam emitted from an optical gun or the like. At any rate, this invention can visually display a powerful image concerned with the emitted light beam by regularly changing the angle, the length, and the light intensity of each light beam at each fold point. In addition, such a display of the emitted light beam can be achieved by carrying out simple processing without changing hardware of the game device.

What is claimed is:

1. A method of visually and virtually displaying, on a display device, an emitted light beam which travels from a start point in a zigzag manner, comprising the steps of:

determining a first reference line drawn at the start point of the emitted light beam and a final target point defining a final attainable zone;

connecting the start point and the final target point by a reference zone line which is inclined at a predetermined angle with respect to the first reference line;

defining a first segment which is extended from the start point at a first angle smaller than the predetermined angle towards the final target point and which represents a part of the emitted light beam from the start point;

calculating a length of the first segment between the start point and a first point which follows the start point and at which the emitted light beam is folded, together with light intensity related to the first segment;

determining a second segment between the first point and a second point which succeeds the first point and at which the emitted light beam is folded, so as to represent another part of the emitted light beam by the second segment;

successively calculating a length, an angle, and light intensity of another part of the emitted light beam represented by the second segment on the basis of the length, the angle, and the light intensity of the first segment; and displaying the emitted light beam which falls within the final attainable zone by repeating the successive calculation of the length, the angle, and the light intensity of the emitted light beam.

2. A method as claimed in claim 1, wherein the first angle of the first segment is less than half the predetermined angle between the first reference line and the reference zone line.

3. A method as claimed in claim 1, wherein the angle of the second segment between the first and the second points is determined on the basis of the angle of the first segment while each angle of segments successively following the second segment is determined on the basis of a previous angle of a previous segment immediately before each segment.

4. A method as claimed in claim 1, wherein each angle of the segments between two adjacent points is determined on the basis of the previous segment at random within a predetermined range.

5. A method as claimed in claim 1, wherein the emitted light beam is represented as a main light beam while a branch light beam branches from the main light beam.

6. A method as claimed in claim 5, wherein the branch light beam branches from either one of the points at which the emitted light beam is folded.

7. A method as claimed in claim 5, wherein the branch light beam is specified by a branch segment which has an angle, a length, and light intensity different from those of the emitted light beam displayed as the main light beam.

8. A method as claimed in claim 7, wherein the branch segment is shorter than each segment of the main light beam and is weaker in light intensity than the main light beam.

9. A method as claimed in claim 1, wherein the emitted light beam is displayed on the display device as a flash of lightning.

10. A method as claimed in claim 5, wherein the main and the branch light beams are displayed on the display device as a flash of lightning.

11. A method as claimed in claim 1, wherein the emitted light beam displaying step comprises the steps of:

successively putting a polygon along each segment representative of the emitted light beam; and attaching, on each polygon, a texture representative of lightning.

12. A method as claimed in claim 7, wherein the branch segment is displayed as lightning by putting a polygon along the branch segment and by attaching, on each polygon, a texture representative of lightning.

13. A method as claimed in claim 11, wherein the emitted light beam displaying step further comprises:

a first color processing step of calculating a first color of a part of the lightning on the texture to obtain a first processed result;

a second color processing step of calculating a second color at a specific location of each polygon to obtain a second processed result; and a displaying step of semitransparently displaying the first and the second processed results.

14. A computer-readable storage medium which stores a program for visually and virtually displaying, on a display device, an emitted light beam which travels from a start point in a zigzag manner, the program comprising the steps of:

determining a first reference line drawn at the start point of the emitted light beam and a final target point defining a final attainable zone;

connecting the start point and the final target point by a reference zone line which is inclined at a predetermined angle with respect to the first reference line;

defining a first segment which is extended from the start point at a first angle smaller than the predetermined angle towards the final target point and which represents a part of the emitted light beam from the start point;

calculating a length of the first segment between the start point and a first point which follows the start point and at which the emitted light beam is folded, together with light intensity related to the first segment;

determining a second segment between the first point and a second point which succeeds the first point and at which the emitted light beam is folded, so as to represent another part of the emitted light beam by the second segment;

successively calculating a length, an angle, and light intensity of another part of the emitted light beam represented by the second segment on the basis of the length, the angle, and the light intensity of the first segment; and displaying the emitted light beam which falls within the final attainable zone by repeating the successive calculation of the length, the angle, and the light intensity of the emitted light beam.

15. An image display device for use in visually and virtually displaying, on a display device, an emitted light beam which travels from a start point in a zigzag manner, comprising:

first processing means for processing the emitted light beam, by dividing the emitted light beam into a sequence of segments each of which is folded at an end point, by determining a first reference line drawn at the start point of the emitted light beam and a final target point defining a final attainable zone, by connecting the start point and the final target point by a reference zone line which is inclined at a predetermined angle with respect to the first reference line, by defining a first segment which is extended from the start point at a first angle smaller than the predetermined angle towards the final target point and which represents a part of the emitted light beam from the start point, and by thereafter successively determining an angle, a length, and light intensity of the following segments on the basis of the angle, the length, and the light intensity calculated in connection with the segment immediately before, and by allowing a final one of the segment to pass through the final attainable zone; and second processing means for putting images representative of the emitted light beam along the segments.

16. An image display device as claimed in claim 15, wherein the first processing means varies the following angle of the next one of the segments by using a previous one of the segments as a reference line and calculates the angle, the length, and the light intensity of each segment on the condition that each length and light intensity is invariable.

17. An image display device as claimed in claim 15, wherein the second processing means comprises:

means for forming an image of the emitted light beam by putting a polygon and a texture representative of the emitted light beam, along the segments; and means for adjusting a color of the image.

18. An image display device as claimed in claim 15, wherein the first processing means comprises means for determining the first angle of the first segment which falls within an angle range smaller than a half the predetermined angle and which is varied at random within the angle range.

* * * * *